United States Patent [19]

Ahlman et al.

[11] Patent Number: 5,056,938

[45] Date of Patent: Oct. 15, 1991

[54] TRACK ROLLER BEARING FLOATING SLEEVE SYSTEM

[75] Inventors: S. Robert Ahlman; William E. Dunn, both of Litchfield; Harry Magazian, Monroe, all of Conn.

[73] Assignee: The Torrington Company, Torrington, Conn.

[21] Appl. No.: 592,944

[22] Filed: Oct. 4, 1990

[51] Int. Cl.[5] .............................................. F16C 33/10
[52] U.S. Cl. .................................. 384/286; 384/276; 384/298; 384/901
[58] Field of Search ............... 384/286, 276, 322, 901, 384/298, 300

[56] References Cited

U.S. PATENT DOCUMENTS 2,675,283  4/1954  Thomson .
3,056,637  10/1962  Shanley et al. .
4,358,167  11/1982  Magazian et al. .................... 384/322
4,428,689  1/1984  Choate ................................. 384/296
4,717,268  1/1988  Orkin ................................... 384/280

Primary Examiner—Lenard A. Footland
Attorney, Agent, or Firm—Michael H. Minns

[57] ABSTRACT

A track roller bearing having a floating sleeve between the inner race and outer race. The floating sleeve has a self-lubricating bearing material on its outer surface. The coefficient of friction of the self-lubricating bearing material increases as the material is worn. When the self-lubricating bearing material coefficient of friction exceeds the coefficient of friction of the floating sleeve inner surface, the floating sleeve will rotate with the outer race until a new unworn surface of self-lubricating bearing material is presented to the load area of the outer race. This precessing of the floating sleeve will continue until the entire surface area of the self-lubricating bearing material is worn, thus extending the track roller bearing life.

10 Claims, 1 Drawing Sheet

TRACK ROLLER BEARING FLOATING SLEEVE SYSTEM

BACKGROUND OF THE INVENTION

This invention relates generally to track roller bearings with a sleeve or liner and more particularly to a sleeve member to which a self-lubricating bearing material is bonded.

Conventional track roller bearings are constructed of rolling elements positioned between inner and outer races, lubricated by grease. Periodic lubrication is required to maintain operational performance with added resistance to corrosion. The performance of these conventional track roller bearings also depends on the effectiveness of the bearing seals which not only ensures that the grease lubrication is maintained within the bearing but also that contamination from external sources is avoided.

Newer aircraft designs require that moving parts shall be able to operate for long periods of time with relatively little or no maintenance. For example, bearings provided for the operation of ailerons on aircraft should be able to operate through tens of thousands of revolutions without any maintenance. Conventional roller bearings may have to be greased after 5,000 revolutions.

In one approach to this periodic maintenance requirement, a bearing liner is attached to the bearing surface of the outer race. The bearing liner contains a self-lubricating bearing material such as polytetrafluorethylene. As an alternative, the self-lubricating bearing material has been attached to the bearing surface of the inner race.

Neither alternative using an attached bearing liner has been satisfactory. The bearing liner attached to the outer race frequently fails to achieve desired lifetimes due to fatigue failure. The liner is subject to a ploughing action by induced liner deflection when loaded by the inner race during rotation of the outer race. Self-lubricating bearing liners attached to the bearing surface of the inner race are subject to premature wear. In typical aircraft applications, the inner race is fixed and does not rotate. The outer race bearing surface will bear against a limited portion of the inner race bearing liner, that portion which is in line with the applied load. In this instance, all the wear is to a small portion of the bearing liner which will prematurely wear out.

Another alternative adds a sleeve of self-lubricating bearing material between the inner race and the outer race. The sleeve is free to float between the races. The bearing sleeve periodically and randomly sticks to one bearing surface or the other. This random sticking can cause uneven wear and premature failure of the bearing.

The foregoing illustrates limitations known to exist in present track roller bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing assembly including a sleeve having an outer radial surface and an inner radial surface. The sleeve is mounted for sliding movement within the bearing assembly and has a self-lubricating bearing material attached thereto.

The foregoing and other aspects will become apparent from the following detailed description of the invention when considered with the accompanying drawing figures.

BRIEF DESCRIPTION OF THE DRAWING FIGURES

FIG. 1 is a partial cross section illustrating an embodiment of the floating sleeve of the present invention; and FIG. 2 is a cross section of a typical track roller bearing.

DETAILED DESCRIPTION

Figure 1:
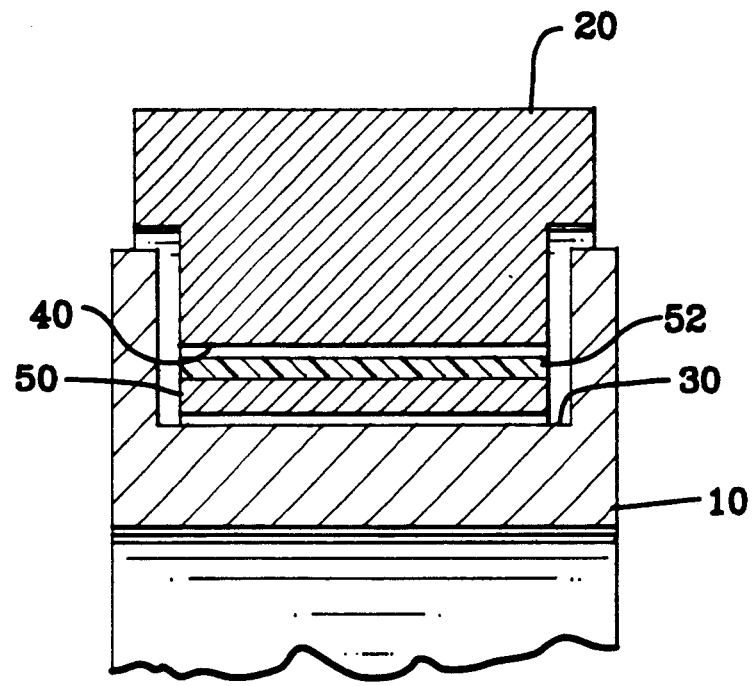

FIG. 1 illustrates a track roller bearing comprised of an inner race 10, and an outer race 20 with a floating bearing sleeve 50 located between the inner race 10 and the outer race 20.

The inner race 10 and the outer race 20 are typically formed from a corrosion resistant metal. Bearing surfaces 30, 40 are formed on opposing surfaces of the inner race 10 and the outer race 20. The outer race bearing surface 40 has been polished to remove any residual marks from metal forming. This polishing is sometimes referred to as superfinishing. A floating bearing sleeve 50, with self-lubricating bearing material 52 bonded to its outer radial surface slidingly engages bearing surfaces 30, 40.

The floating bearing sleeve 50 is steel. Other materials can be used as long as the material has sufficient stiffness to prevent undue flexing of the self-lubricating bearing material 52 on the floating bearing sleeve 50 outer radial surface. The self-lubricating bearing material 52 is a calendared fabric containing solid lubricant threads made of polytetrafluoroethylene, known as Telfon. A fabric such as the one disclosed in U.S. Pat. No. 4,358,167 is the preferred fabric for the self-lubricating bearing material 52.

The fabric is a weave of solid lubricant threads, polytetrafluoroethylene, interwoven with backing or support threads, polyetheretherkeytone. Polyetheretherkeytone is used for the backing threads because it has adequate resistance to contaminants and cleaning solutions typically used by the airline industry. A weave such as the weave disclosed in U.S. Pat. No. 4,358,167 is used. The upper surface of this weave is predominantly solid lubricant threads and the lower surface is predominantly backing threads. This weave gives the desired characteristic of an increasing coefficient of friction as the fabric is worn away. Typically, the self-lubricating bearing material 52 is bonded to the floating bearing sleeve 50 using a phenolic adhesive, modified phenolic adhesive or a vinyl phenolic.

A lubricant is used between the inner race bearing surface 30 and the floating bearing sleeve 50. The key characteristic of the lubricant is that the coefficient of friction must be higher than the coefficient of friction of the upper surface of the self-lubricating bearing material 52. Normally, the floating bearing sleeve 50 does not rotate since the coefficient of friction between the floating bearing sleeve 50 and the outer race bearing surface 40 is substantially less than the coefficient of friction between the floating bearing sleeve 50 and the inner race bearing surface 30. The preferred lubricant is a dry film lubricant such as molybdenum disulfide or Dycronite ®, by Lubrication Services, Inc. Other lubricants such as a solid self-lubricating material may be used between the inner race bearing surface 30 and the floating bearing sleeve 50.

Figure 2:
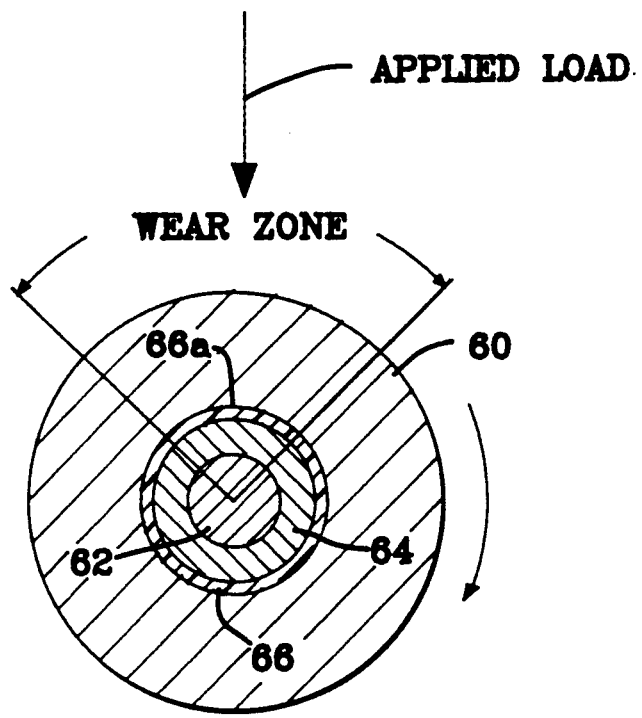

FIG. 2 (designated prior art) depicts a cross section of a typical track roller bearing with self-lubricating material 66 bonded to the inner race 64. The inner race 64 is attached to a shaft or securing fastener 62 such that the inner race 64 does not rotate. In a typical mode of operation, the applied bearing load is directed vertically as indicated by the arrow, thus causing the outer race 60 to bear against a portion 66a of the self-lubricating bearing material 66 of the inner race 64 in the illustrated wear zone. Thus, if the inner race 64 is fixed in position, only the portion 66a of bearing material 66 in the wear zone will be subjected to wear. The floating bearing sleeve 50 of the present invention is designed to periodically rotate, thus presenting a new surface of the self-lubricating bearing material 52 to the wear zone.

As the outer race bearing surface 40 wears against the self-lubricating bearing material 52, the self-lubricating bearing material 52 is worn away The area of wear is only a fraction of the complete surface area of the floating bearing sleeve 50, that area which is in line with the applied load. As the self-lubricating bearing material 52 is worn, its coefficient of friction increases until its coefficient of friction exceeds the coefficient of friction between the floating bearing sleeve 50 and the inner race bearing surface 30. At this time, the floating bearing sleeve 50 will begin to turn with the outer race bearing surface 40. As the floating bearing sleeve 50 turns, a new unworn area of the self-lubricating bearing material will precess under the wear zone of the outer race bearing surface 40. Once the coefficient of friction of the self-lubricating bearing material 52 has again become less than the coefficient of friction between the floating bearing sleeve 50 and the inner race bearing surface 30, the floating bearing sleeve 50 stops turning.

The new area of self-lubricating material under the wear zone of the outer race bearing surface 40 begins to wear away increasing the coefficient of friction repeating the process described above. The repeated precessing of the floating bearing sleeve 50 results in even and complete wear of the self-lubricating bearing material 52. A track roller bearing with the floating bearing sleeve described above has a lifetime of several times the lifetime of a conventional track roller bearing with self-lubricated bearing material bonded to a bearing race.

FIG. 1 shows the preferred embodiment of the present invention with the outer race 20 being rotatable. For applications where the inner race 10 rotates, the self-lubricating bearing material 52 is bonded to the inner radial surface of the sleeve 50.

Having described the invention, what is claimed is:

1. A bearing assembly comprising:
    a first race member having a first peripheral bearing surface;
    a coaxial second race member being rotatable relative to said first race member, said second race member having a second peripheral bearing surface;
    a sleeve member having an outer radial surface and an inner radial surface, the sleeve member being disposed between and in sliding engagement with said first bearing surface and said second bearing surface; and
    said sleeve member having a self-lubricating bearing material bonded to the radial surface adjacent said second bearing surface, the sleeve member being incrementally movable by the second bearing surface in response to wearing away of the material and said self-lubricating bearing material having a first surface, a second surface and a varying coefficient of friction between the surfaces.

2. The bearing of claim 1 wherein said first race member is an inner race and said second race member is an outer race.

3. The bearing of claim 1 wherein said first race member is an outer race and said second race member is an inner race.

4. The bearing assembly of claim 1 wherein said self-lubricating bearing material further comprises:
    a fabric of interwoven solid lubricant threads and support threads; and
    the first surface of said fabric being predominantly solid lubricant threads and the second surface of said fabric being predominantly support threads, thereby varying the coefficient of friction of said fabric between the first surface and the second surface, said coefficient of friction having a first value at the first surface and a second value greater than the first value at the second surface.

5. The bearing assembly of claim 4 wherein said solid lubricant threads are polytetrafluorethylene.

6. The bearing of claim 4 wherein said support threads are polyetheretherkeytone.

7. For use with a track roller bearing assembly, a floating sleeve member comprising:
    an open cylinder having an outer radial surface and an inner radial surface in sliding engagement with said track roller bearing assembly; and
    a self-lubricating bearing material attached to the outer radial surface of said cylinder, said material having a first surface, a second surface and a varying coefficient of friction, the coefficient of friction of said self-lubricating bearing material varying between the first surface of said self-lubricating bearing material and the second surface of said self-lubricating material, said coefficient of friction having a first value at the first surface and a second value greater than the first value at the second surface.

8. The floating sleeve member of claim 7 wherein said self-lubricating bearing material further comprises:
    a fabric of interwoven solid lubricant threads and support threads, the first surface of said fabric being predominantly solid lubricant threads and the second surface of said fabric being predominantly support threads.

9. The floating sleeve member of claim 8 wherein said solid lubricant threads are polytetrafluorethylene.

10. The floating sleeve member of claim 8 wherein said support threads are polyetheretherkeytone.

* * * * *